United States Patent
Brizendine et al.

(10) Patent No.: US 11,231,102 B1
(45) Date of Patent: Jan. 25, 2022

(54) DIFFERENTIAL ASSEMBLY OIL MANAGEMENT INSERT

(71) Applicant: GM GLOBAL TECHNOLOGY OPERATIONS LLC, Detroit, MI (US)

(72) Inventors: Chad R. Brizendine, Fenton, MI (US); David S. Schulz, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/087,660

(22) Filed: Nov. 3, 2020

(51) Int. Cl.
  *F16H 57/04* (2010.01)
  *B62D 63/04* (2006.01)
  *F16H 57/037* (2012.01)

(52) U.S. Cl.
  CPC ......... *F16H 57/0427* (2013.01); *B62D 63/04* (2013.01); *F16H 57/037* (2013.01); *F16H 57/0471* (2013.01); *F16H 57/0483* (2013.01)

(58) Field of Classification Search
  None
  See application file for complete search history.

(56) References Cited

U.S. PATENT DOCUMENTS

| | | | | |
|---|---|---|---|---|
| 5,184,967 A * | 2/1993 | Onoue | ................. | B63H 20/002 440/75 |
| 5,498,084 A * | 3/1996 | Boyd | ................. | F16C 33/1085 29/898.11 |
| 5,724,864 A * | 3/1998 | Rodgers | ................ | F16H 57/027 74/606 R |
| 2016/0265647 A1* | 9/2016 | Elzib | ..................... | F16H 57/037 |

* cited by examiner

*Primary Examiner* — Colby M Hansen
(74) *Attorney, Agent, or Firm* — Quinn IP Law

(57) ABSTRACT

A motor vehicle drive-axle includes a drive-axle housing defining a gear-set cavity and a shaft bore having first and second bearing pockets and an oil cavity arranged between the first and second bearing pockets. The housing also defines a supply channel and a return passage configured to respectively supply oil from the gear-set cavity to the oil cavity and return oil from the oil cavity to the gear-set cavity. The housing also includes an input shaft extending through the shaft bore into the differential gear-set cavity. The housing additionally includes first and second bearings arranged within respective first and second bearing pockets for supporting the input shaft. The housing additionally includes a lubrication regulating insert arranged inside the oil cavity. The insert defines first and second lubrication channels configured to direct oil from the supply passage to respective first and second bearings.

20 Claims, 3 Drawing Sheets

DIFFERENTIAL ASSEMBLY OIL MANAGEMENT INSERT

INTRODUCTION

The disclosure relates to an oil management insert for a motor vehicle differential assembly.

Motor vehicles may be configured as either two-wheel-drive, i.e., using a single drive- or powered axle, or as having multiple drive-axles. Either type of a vehicle may employ a conventional powertrain, where a single engine is used to propel the vehicle, an electric powertrain, where an electric motor is used to propel the vehicle, or a hybrid powertrain, where two or more distinct power sources, such as an internal combustion engine and an electric motor, are used to accomplish the same task. Motor vehicles may also employ multiple independent power-sources, such as an internal combustion engine and an electric motor, to independently power individual vehicle drive-axles.

Each powered axle typically includes a final drive assembly with a differential that allows opposite side, i.e., left and right side, driven wheels to rotate at different speeds when the vehicle negotiates a turn. Specifically, the differential permits the driven wheel that is traveling around the outside of the turning curve to roll farther and faster than the driven wheel traveling around the inside of the turning curve, while approximately equal torque is applied to each of the driven wheels. An increase in the speed of one driven wheel is balanced by a decrease in the speed of the other driven wheel, while the average speed of the two driven wheels equals the input rotational speed of the drive shaft connecting the power-source to the differential. Internal load bearing and rotating components of such powered axles generally require consistent lubrication and cooling for reliable long-term operation.

SUMMARY

A motor vehicle drive-axle includes a drive-axle housing. The drive-axle housing defines a differential gear-set cavity and a shaft bore including first and second bearing pockets and an oil cavity arranged between the first and second bearing pockets. The drive-axle housing also defines a supply passage configured to supply oil from the differential gear-set cavity to the oil cavity and a return passage configured to return oil from the oil cavity to the differential gear-set cavity. The drive-axle housing also includes a differential gear-set arranged within the differential gear-set cavity and an input shaft extending through the shaft bore into the differential gear-set cavity, operatively connected to the differential gear-set, and configured to transfer a drive torque to the differential gear-set.

The drive-axle housing additionally includes a first bearing arranged within the first bearing pocket and configured to support the input shaft relative to the drive-axle housing. The drive-axle housing also includes a second bearing arranged within the second bearing pocket between the first bearing and the differential gear-set cavity and configured to support the input shaft relative to the drive-axle housing. The drive-axle housing additionally includes a lubrication regulating insert arranged inside the oil cavity. The lubrication regulating insert defines a first lubrication channel configured to direct oil from the oil supply passage to the first bearing and a second lubrication channel configured to direct oil from the oil supply passage to the second bearing.

The lubrication regulating insert may also define an oil dam configured to maintain a preset level of oil within the shaft bore at the first bearing and thereby minimize oil starvation of the first bearing.

The lubrication regulating insert may be shaped as a cylindrical shell arranged concentrically around a central axis.

The oil dam may be defined by an annular flange arranged orthogonally with respect to the cylindrical shell and extending toward the central axis.

The lubrication regulating insert may additionally define a lubrication exit aperture in fluid communication with the oil return passage of the drive-axle housing.

The lubrication regulating insert may additionally define an oil collection trough configured to align with the supply passage of the drive-axle housing. In such an embodiment, each of the first lubrication channel and the second lubrication channel may be in fluid communication with the oil collection trough.

The first lubrication channel may be arranged at an angle with respect to the second lubrication channel.

The lubrication regulating insert may be pressed into the oil cavity.

The lubrication regulating insert may be constructed from a polymer composite or a metallic material.

The lubrication regulating insert may be either a stamped, molded, or sintered component.

A motor vehicle employing such a drive-axle is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
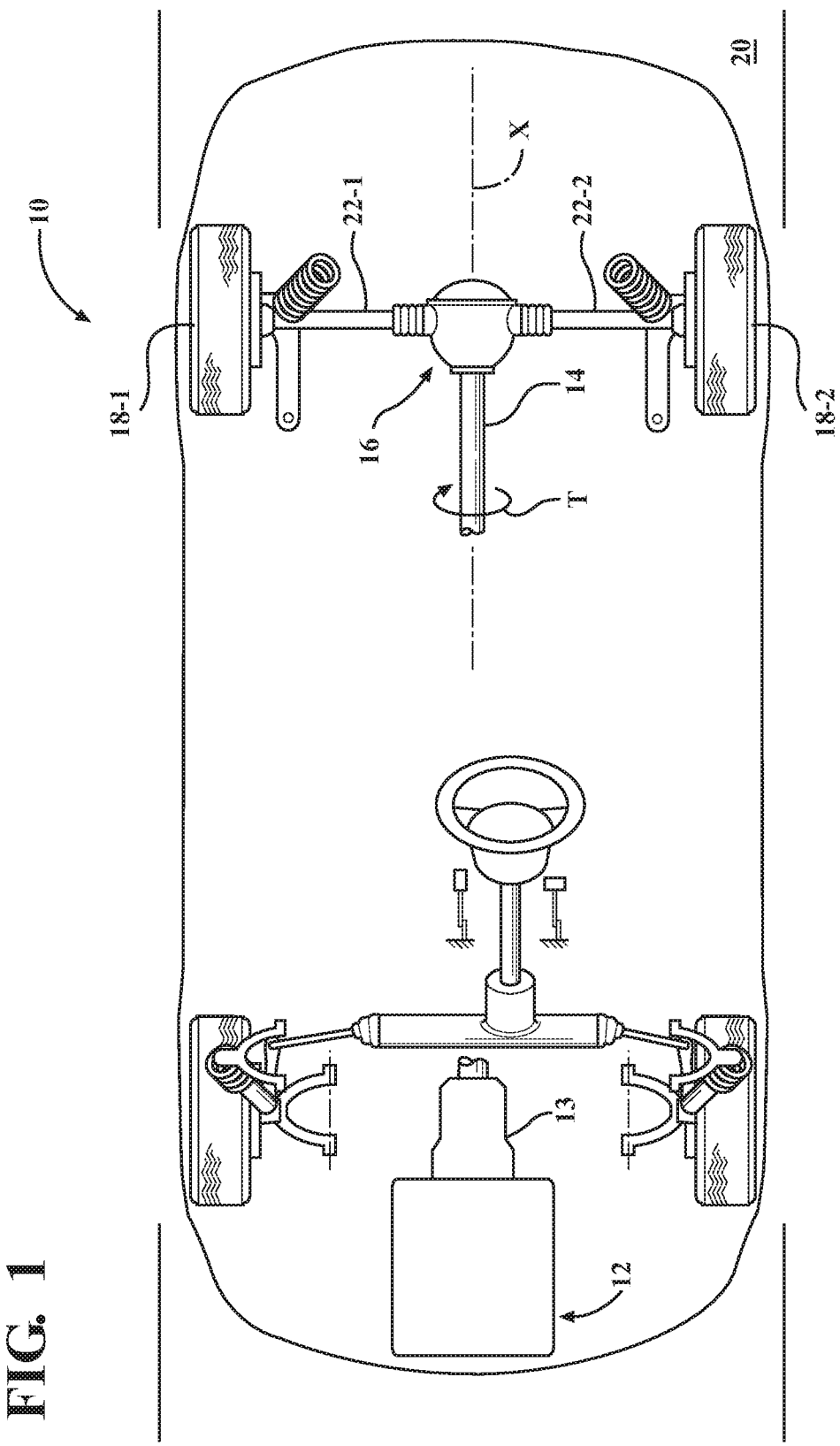
FIG. 1 is a schematic illustration of a motor vehicle employing a powertrain that includes a power-source coupled to a transmission assembly and operatively connected via a drive shaft to a drive-axle, according to the disclosure.
Figure 2:
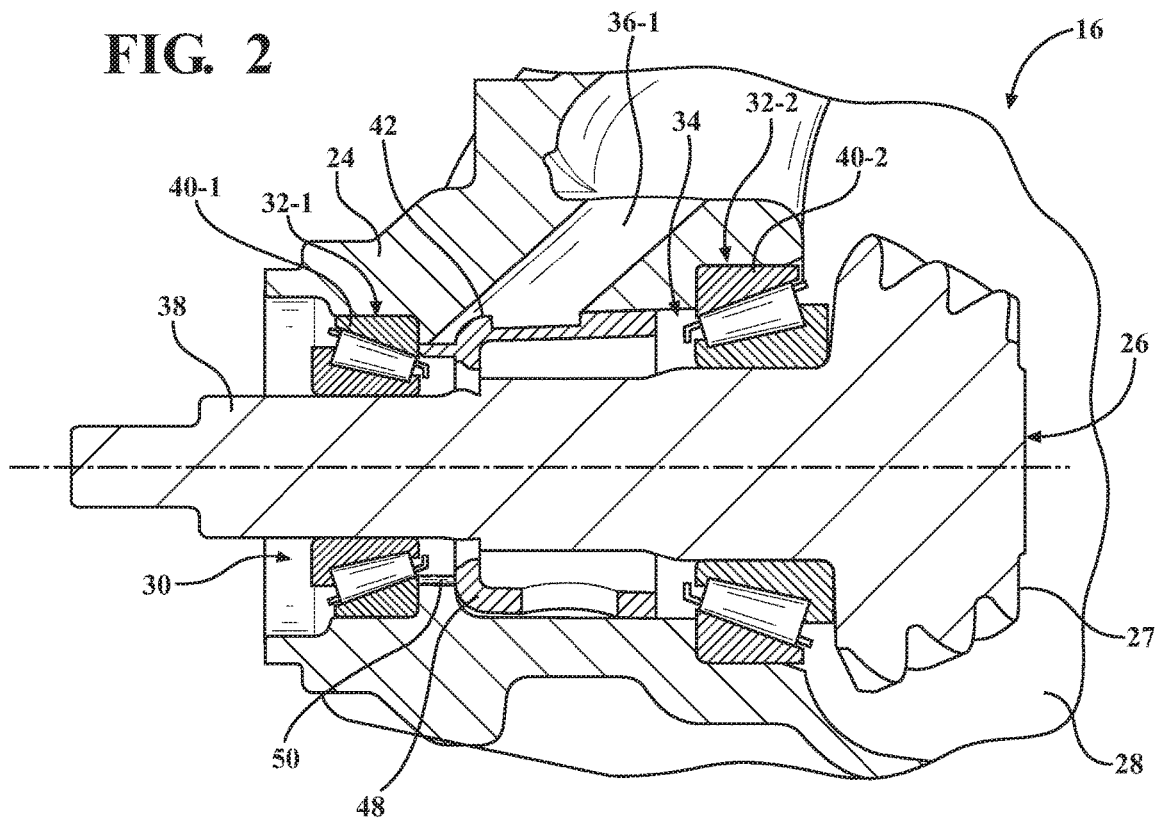
FIG. 2 is a schematic close-up partial cross-sectional view of the drive-axle shown in FIG. 1, specifically depicting an input shaft supported by bearings within a differential housing, and a lubrication regulating insert arranged between the bearings, according to the disclosure.

Referring to the drawings in which like elements are identified with identical numerals throughout, FIGS. 1 and 2 illustrate a wheeled motor vehicle 10. The vehicle 10 is generally arranged along a longitudinal vehicle axis X. As shown, in FIG. 1, the vehicle 10 includes a power-source 12 configured to generate power-source drive torque T, coupled to a transmission assembly 13, and operatively connected, via a drive shaft 14, to a drive-axle 16. The drive-axle 16 is in turn operatively connected to respective left- and right-side road wheels 18-1, 18-2 configured to provide vehicle propulsion. Although a single power-source 12 and a single drive-axle 16 are shown, nothing precludes the vehicle 10 from employing a combination of power-sources and multiple drive-axles for propulsion thereof. The specific road wheels 18-1, 18-2 receiving the drive torque T from the power-source 12 to power the vehicle 10 down a road surface 20 may be defined as "drive" wheels.

As shown, the drive-axle 16 is arranged substantially transverse to the longitudinal vehicle axis X, such that the drive-axle rotates individual first and second axle shafts 22-1, 22-2 to thereby turn the respective first and second drive wheels 18-1, 18-2. According to the present disclosure, the drive-axle 16 includes a drive-axle housing 24. The drive-axle 16 also includes a differential gear-set 26 having a pinion gear 27. Although not shown in its entirety, the differential gear-set 26 is typically a reduction gear train with three shafts and having the property that the rotational speed of one shaft is the average of the speeds of the others, or a fixed multiple of that average. The differential gear-set 26 is operatively connected to the power-source 12 via the drive shaft 14 to receive and split the drive torque T among the axle-shafts 22-1 and 22-2. In other words, the first axle-shaft 22-1 receives a portion of the drive torque T and transmits that torque portion to the first drive wheel 18-1, while the second axle-shaft 22-2 receives another portion of the torque T and transmits that other torque portion to the second drive wheel 18-2.

As shown in FIG. 2, the drive-axle housing 24 defines a differential gear-set cavity 28 also including a main oil sump. The differential gear-set 26 is arranged within the differential gear-set cavity 28. The drive-axle housing 24 also defines a shaft bore 30, including a first bearing pocket 32-1 and a second bearing pocket 32-2, and an oil cavity 34 arranged between the first and second bearing pockets. The drive-axle housing 24 additionally defines a supply passage 36-1 (shown in FIGS. 2 and 4) configured to supply differential oil from the differential gear-set cavity 28 and its main sump to the oil cavity 34 and a return passage 36-2 (shown in FIG. 4) configured to return oil from the oil cavity to the differential gear-set cavity. An input shaft 38 extends through the shaft bore 30 into the differential gear-set cavity 28 and is operatively connected to the differential gear-set via the pinion gear 27. The input shaft 38 is specifically configured to transfer the drive torque T to the differential gear-set 26.

The drive-axle 16 also includes a first bearing 40-1 arranged within the first bearing pocket 32-1 and a second bearing 40-2 arranged within the second bearing pocket 32-2. As shown, the second bearing 40-2 is arranged between the first bearing 40-1 and the differential gear-set cavity 28. The first bearing 40-1 and the second bearing 40-2 may be configured as angular contact roller or thrust bearings, and are together configured to support the input shaft 38 relative to the drive-axle housing 24. The drive-axle 16 additionally includes a lubrication regulating insert 42 arranged and fixed inside the oil cavity 34. Specifically, the lubrication regulating insert 42 may be pressed into the oil cavity 34. The lubrication regulating insert 42 may be constructed from a moldable high-temperature polymer composite or a formable metallic material. The lubrication regulating insert 42 may be either a stamped, sintered, machined, or molded component.

Figure 3:
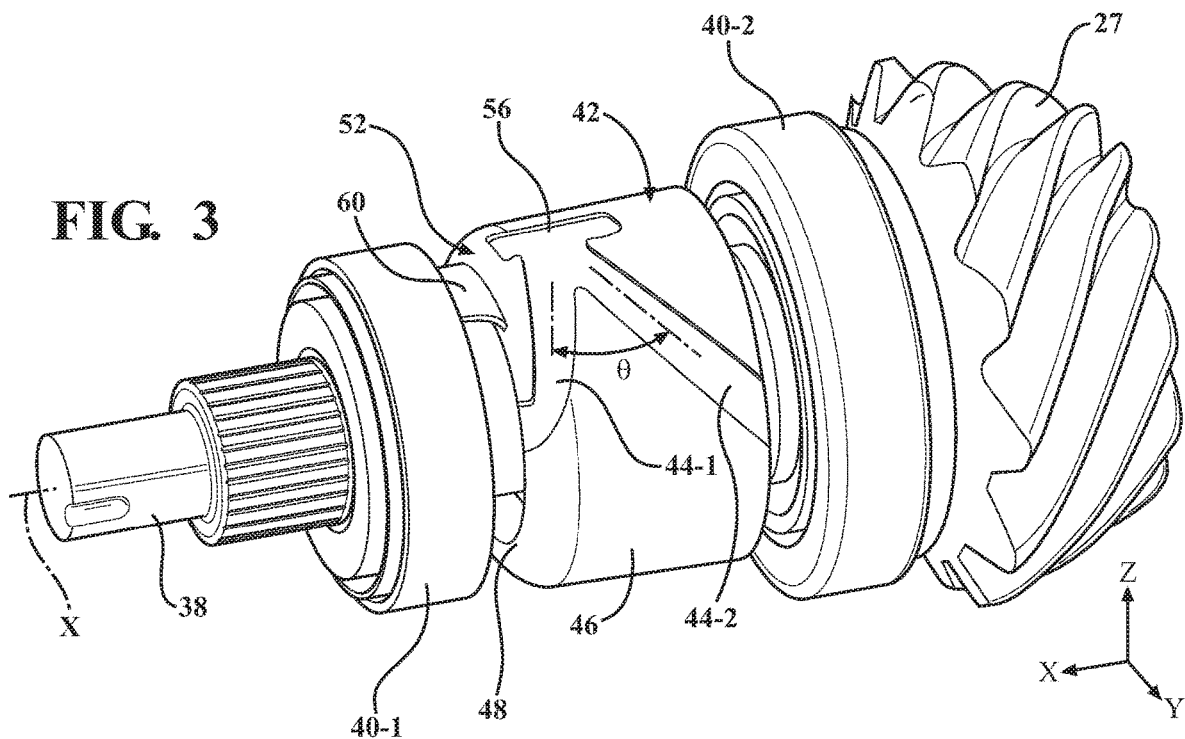
FIG. 3 is a schematic close-up perspective view of the input shaft supported by bearings and the lubrication regulating insert arranged relative thereto, with the differential housing structure removed for ease of viewing details of the insert relative to arrangement of the bearings.

As shown in FIG. 3 with respect to X-Y-Z coordinate axes, the insert 42 defines a first lubrication channel 44-1 configured to direct oil from the oil supply passage 36-1 to the first bearing 40-1. The insert 42 also defines a second lubrication channel 44-2 configured to direct oil from the oil supply passage 36-1 to the second bearing 40-2. As shown, the lubrication regulating insert 42 may be shaped as a cylindrical shell 46 arranged substantially concentrically around a central axis X. As shown in FIGS. 2 and 3, the lubrication regulating insert 42 may additionally define an oil dam 48. The oil dam 48 is configured to maintain a preset level 50 and amount of oil (shown in FIG. 2) within the shaft bore 30 at the first bearing 40-1 and thereby minimize oil starvation of the subject bearing during operation of the vehicle 10 and the drive-axle 16.

Although not specifically shown, for proper engagement and operation of the drive shaft 14, the drive-axle 16 may be installed in the vehicle 10 at a predefined angle with respect to the road surface 20. In such an application, the oil inside the drive-axle 16 will have a general tendency to flow away from the first bearing 40-1 and in the direction of the second bearing 40-2. Consequently, the oil dam 48 may also block at least some of the oil from leaving the first bearing 40-1 and flowing down the shaft bore 30. As shown in FIGS. 2 and 3, the oil dam 48 may be defined by an annular flange 52 arranged orthogonally with respect to the cylindrical shell 46 and extending toward the central axis X, thereby configured to maintain the first bearing 40-1 at least partially immersed in oil during operation of the drive-axle 16.

The lubrication regulating insert 42 may additionally define a lubrication exit aperture 54 (shown in FIGS. 4 and 5) in fluid communication with the oil return passage 36-2 of the drive-axle housing 24. When viewing the lubrication regulating insert 42 in the Y-Z plane (shown in FIG. 3), the lubrication exit aperture 54 may be arranged between 3 and 9 o'clock to permit an appropriate balance between an amount of oil maintained in the oil cavity 34 bounded by the insert 42, lubricating the second bearing 40-2, and returned to the main sump. The lubrication exit aperture 54 being positioned at approximately 6 o'clock is shown in FIG. 4, while a position of the lubrication exit aperture 54 between 4 and 5 o'clock is shown in FIG. 5.

The lubrication regulating insert 42 may further define an oil collection trough 56. The oil collection trough 56 is arranged at approximately 12 o'clock (shown in FIG. 4), and configured to align with the supply passage 36-1 of the drive-axle housing 24. As shown, each of the first lubrication channel 44-1 and the second lubrication channel 44-2 may be in fluid communication with the oil collection trough 56. As shown in FIG. 3, the first lubrication channel 44-1 may be arranged at an angle $\theta$ with respect to the second lubrication channel 44-2 down the same side of the lubrication regulating insert 42. Alternatively, the first lubrication channel 44-1 and the second lubrication channel 44-2 may be arranged on opposite sides of the lubrication regulating insert 42, as shown in FIG. 4.

Figure 4:
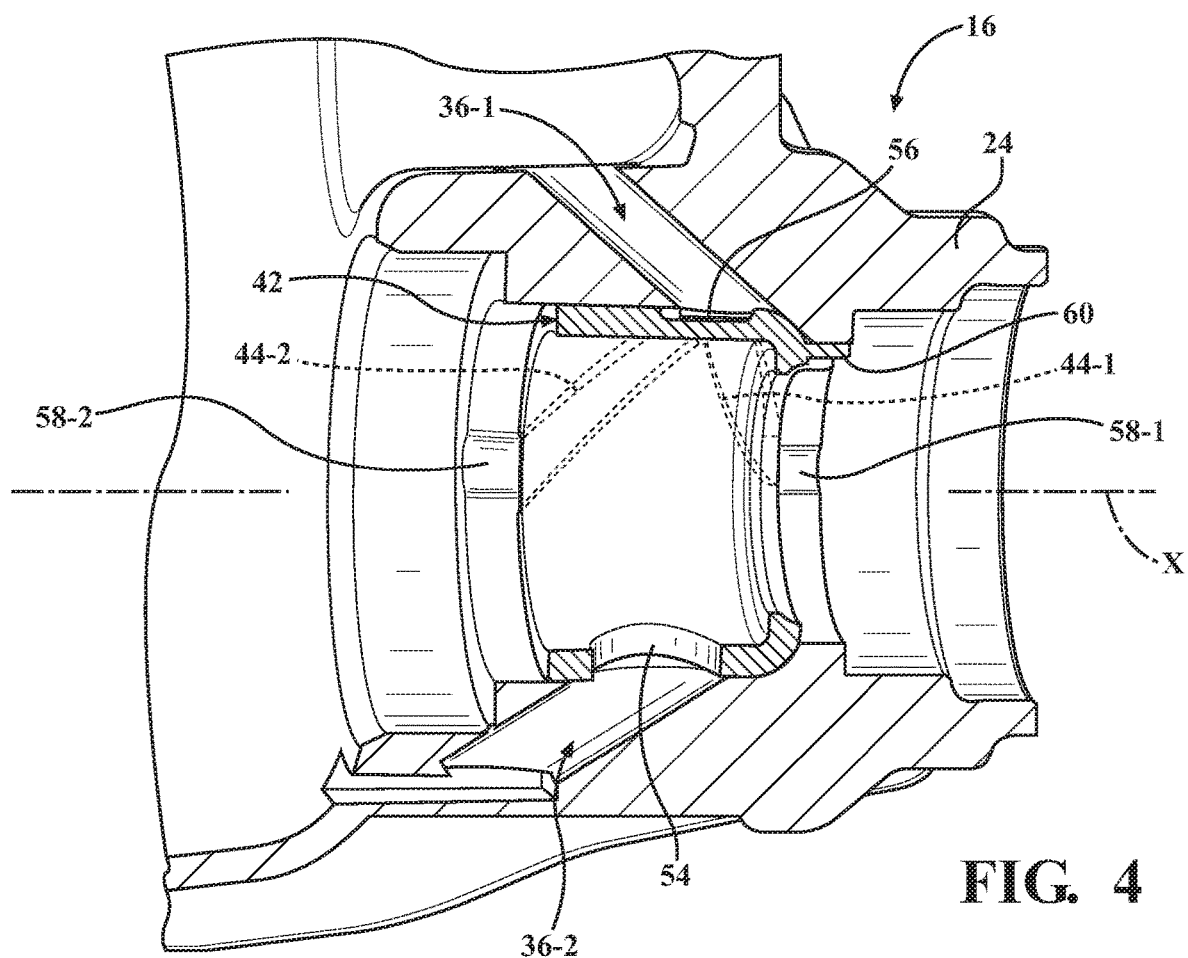
FIG. 4 is a schematic close-up perspective view the lubrication regulating insert arranged inside the differential housing, with the input shaft and bearings removed for ease of viewing details of the insert and corresponding features of the differential housing.
Figure 5:
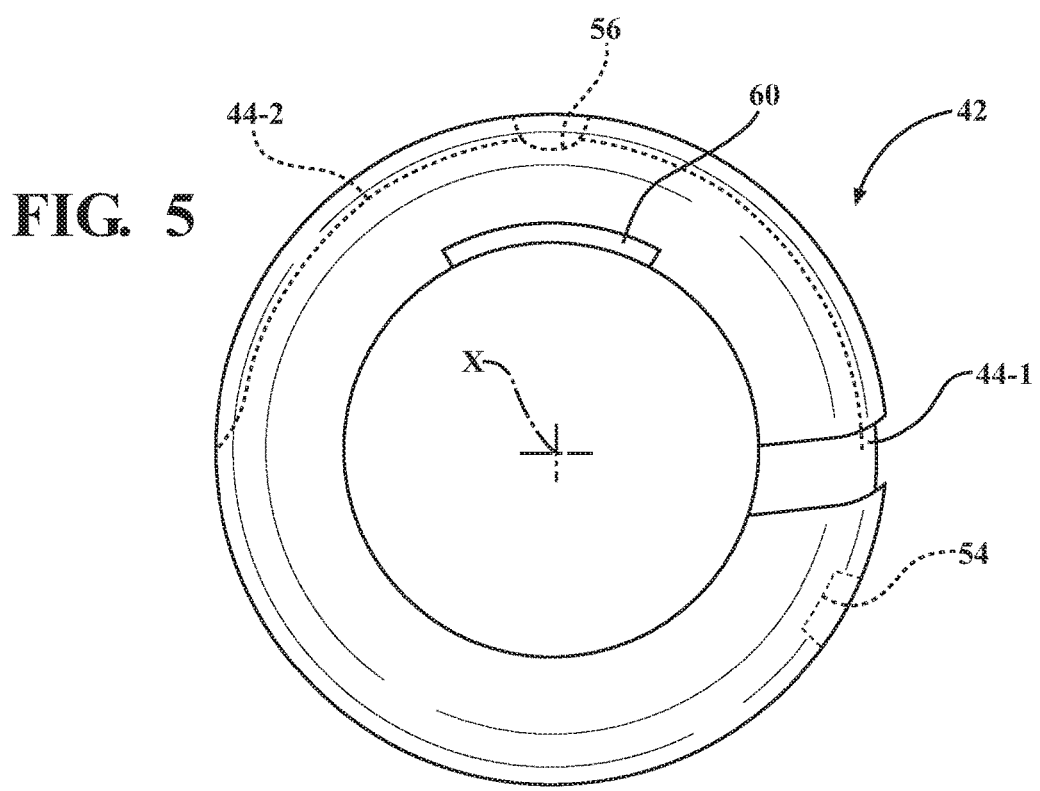
FIG. 5 is a schematic close-up front view of an embodiment of the lubrication regulating insert shown in FIGS. 2-4, according to the disclosure.

As shown in FIG. 4, the drive-axle housing 24 may further define, such as by being cast and/or machined therein, a first feed channel 58-1 and a second feed channel 58-2. The first feed channel 58-1 is configured to communicate oil from the first lubrication channel 44-1 to the first bearing 40-1, while the second feed channel 58-2 is configured to communicate oil from the second lubrication channel 44-2 to the second bearing 40-2. As may be seen in FIGS. 2-5, the lubrication regulating insert 42 may include a projection 60. The projection 60 may be configured to engage and locate in a groove (not shown) cast and/or machined in the drive-axle housing 24. The projection 60 is intended to index the insert in the shaft bore 30 to thereby align the oil collection trough 56 with the supply passage 36-1, the lubrication exit aperture 54 with the return passage 36-2, and the first and second feed channels 58-1, 58-2 with the respective first and second lubrication channels 44-1, 44-2.

Overall, the lubrication regulating insert 42 is purposefully configured and positioned in the drive-axle housing 24 to direct lubricating and cooling oil to the first and second bearings 40-1, 40-2. Specific shape and arrangement of the lubrication regulating insert 42 is intended to minimize oil starvation at the first bearing 40-1, as well as supply a metered amount of oil to the second bearing 40-2 during operation of the motor vehicle 10. In other words, as the drive torque T is distributed among the first axle-shaft 22-1 and the second axle-shaft 22-2 for propelling the motor vehicle 10, the differential oil will circulate through the first and second bearings 40-1, 40-2, to ensure appropriate durability and reliability of the drive-axle 16.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A motor vehicle drive-axle comprising:
   a drive-axle housing defining:
      a differential gear-set cavity;
      a shaft bore including first and second bearing pockets and an oil cavity arranged between the first and second bearing pockets;
      a supply passage configured to supply oil from the differential gear-set cavity to the oil cavity; and
      a return passage configured to return oil from the oil cavity to the differential gear-set cavity;
   a differential gear-set arranged within the differential gear-set cavity;
   an input shaft extending through the shaft bore into the differential gear-set cavity, operatively connected to the differential gear-set, and configured to transfer a drive torque to the differential gear-set;
   a first bearing arranged within the first bearing pocket and configured to support the input shaft relative to the drive-axle housing;
   a second bearing arranged within the second bearing pocket between the first bearing and the differential gear-set cavity and configured to support the input shaft relative to the drive-axle housing; and
   a lubrication regulating insert arranged inside the oil cavity and defining:
      a first lubrication channel configured to direct oil from the oil supply passage to the first bearing; and
      a second lubrication channel configured to direct oil from the oil supply passage to the second bearing.

2. The motor vehicle drive-axle according to claim 1, wherein the lubrication regulating insert additionally defines an oil dam configured to maintain a preset level of oil within the shaft bore at the first bearing and thereby minimize oil starvation of the first bearing.

3. The motor vehicle drive-axle according to claim 2, wherein the lubrication regulating insert is shaped as a cylindrical shell arranged concentrically around a central axis.

4. The motor vehicle drive-axle according to claim 3, wherein the oil dam is defined by an annular flange arranged orthogonally with respect to the cylindrical shell and extending toward the central axis.

5. The motor vehicle drive-axle according to claim 1, wherein the lubrication regulating insert additionally defines a lubrication exit aperture in fluid communication with the oil return passage of the drive-axle housing.

6. The motor vehicle drive-axle according to claim 1, wherein the lubrication regulating insert additionally defines an oil collection trough configured to align with the supply passage of the drive-axle housing, and wherein each of the first lubrication channel and the second lubrication channel is in fluid communication with the oil collection trough.

7. The motor vehicle drive-axle according to claim 6, wherein the first lubrication channel is arranged at an angle with respect to the second lubrication channel.

8. The motor vehicle drive-axle according to claim 1, wherein the lubrication regulating insert is pressed into the oil cavity.

9. The motor vehicle drive-axle according to claim 1, wherein the lubrication regulating insert is constructed from a polymer composite or a metallic material.

10. The motor vehicle drive-axle according to claim 1, wherein the lubrication regulating insert is either a stamped, molded, or sintered component.

11. A motor vehicle comprising:
    a power-source configured to generate a drive torque;
    a first road wheel and a second road wheel;
    a drive-axle operatively connected to the power-source and configured to transfer the drive torque to the first and second road wheels, the drive-axle including:
       a drive-axle housing defining:
          a differential gear-set cavity;
          a shaft bore including first and second bearing pockets and an oil cavity arranged between the first and second bearing pockets;
          a supply passage configured to supply oil from the differential gear-set cavity to the oil cavity; and
          a return passage configured to return oil from the oil cavity to the differential gear-set cavity;
       a differential gear-set arranged within the differential gear-set cavity;
       an input shaft extending through the shaft bore into the differential gear-set cavity, operatively connected to the differential gear-set, and configured to transfer the drive torque to the differential gear-set;
       a first bearing arranged within the first bearing pocket and configured to support the input shaft relative to the drive-axle housing;
       a second bearing arranged within the second bearing pocket between the first bearing and the differential gear-set cavity and configured to support the input shaft relative to the drive-axle housing; and
       a lubrication regulating insert arranged inside the oil cavity and defining:
          a first lubrication channel configured to direct oil from the oil supply passage to the first bearing; and a second lubrication channel configured to direct oil from the oil supply passage to the second bearing.

12. The motor vehicle according to claim 11, wherein the lubrication regulating insert additionally defines an oil dam configured to maintain a preset level (amount) of oil within the shaft bore at the first bearing and thereby minimize oil starvation of the first bearing.

13. The motor vehicle according to claim 12, wherein the lubrication regulating insert is shaped as a cylindrical shell arranged concentrically around a central axis.

14. The motor vehicle according to claim 13, wherein the oil dam is defined by an annular flange arranged orthogonally with respect to the cylindrical shell and extending toward the central axis.

15. The motor vehicle according to claim 11, wherein the lubrication regulating insert additionally defines a lubrication exit aperture in fluid communication with the oil return passage of the drive-axle housing.

16. The motor vehicle according to claim 11, wherein the lubrication regulating insert additionally defines an oil collection trough configured to align with the supply passage of the drive-axle housing, and wherein each of the first lubrication channel and the second lubrication channel is in fluid communication with the oil collection trough.

17. The motor vehicle according to claim 16, wherein the first lubrication channel is arranged at an angle with respect to the second lubrication channel.

18. The motor vehicle according to claim 11, wherein the lubrication regulating insert is pressed into the oil cavity.

19. The motor vehicle according to claim 11, wherein the lubrication regulating insert is constructed from a polymer composite or a metallic material.

20. The motor vehicle according to claim 11, wherein the lubrication regulating insert is either a stamped, molded, or sintered component.

* * * * *